Patented Apr. 8, 1930

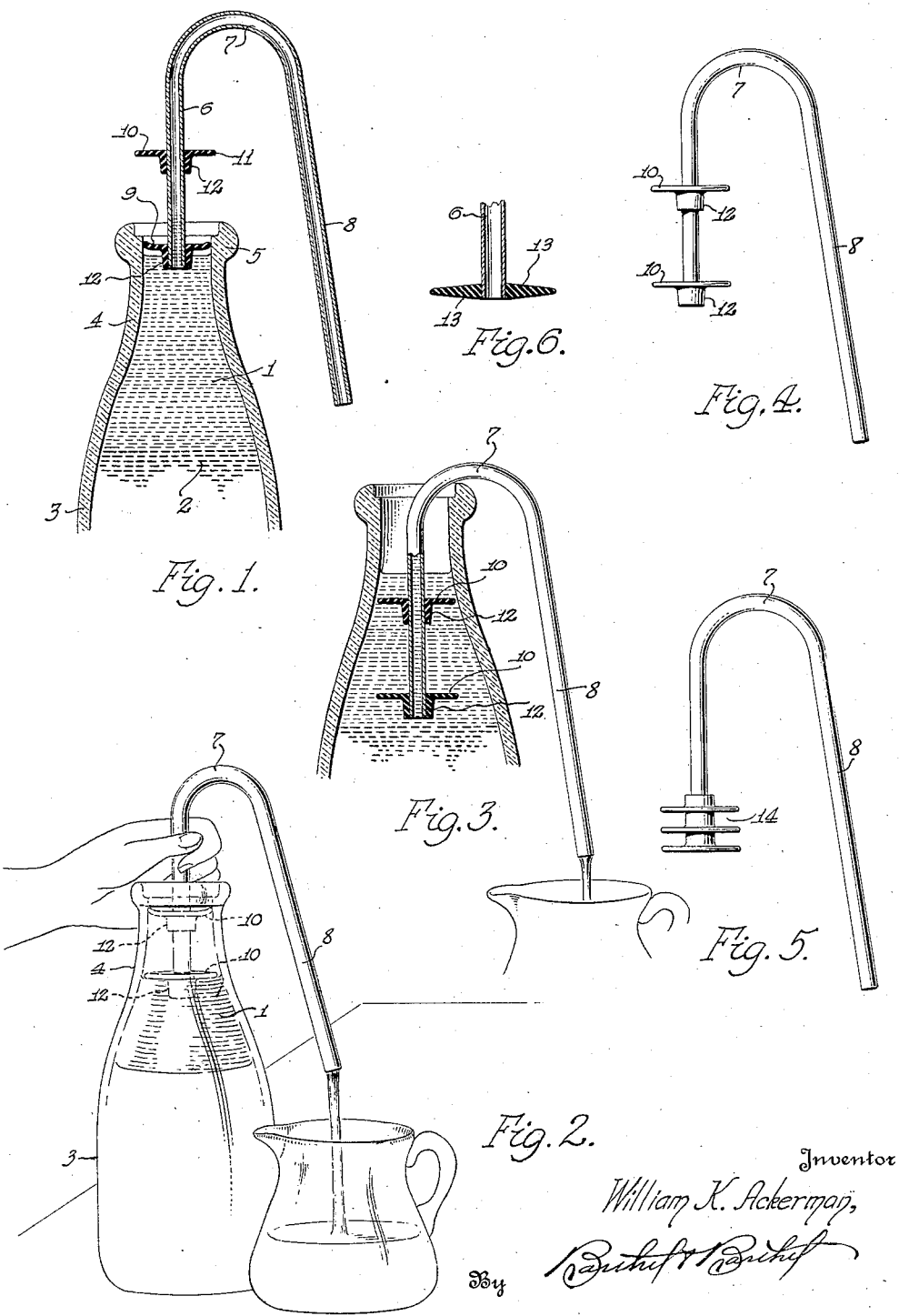

1,753,732

UNITED STATES PATENT OFFICE

WILLIAM K. ACKERMAN, OF DETROIT, MICHIGAN

LIQUID EXTRACTOR

Application filed September 2, 1927. Serial No. 217,052.

My invention aims to provide a liquid separator or extractor that may be used for removing light liquids from heavy liquids, particularly those liquids which by flotation accumulate on the surface of a heavy liquid. It is in this connection that my invention has been primarily designed for separating or extracting cream from a milk bottle or like receptacle. The device may be advantageously used by housewives for obtaining cream for various purposes, particularly cream that is to be whipped and cannot include any skimmed milk.

My cream extracting or removing device is constructed to provide a siphonic action when the device is placed in use and for this purpose a siphonic tube is equipped with pistons by which the mouth of a bottle or like receptacle may be sealed and the cream forced upwardly into the siphonic tube until a siphonic action is established. I am aware that a single piston may have been used for such a purpose, but when inserting such a piston in the mouth of the milk bottle and manipulating it therein, extreme care must be exercised to prevent the single piston from being tilted and the seal between the piston and bottle broken. When such happens the cream is forced over the edge of the single piston and not upwardly into the siphonic member. The siphonic action is destroyed and very often considerable cream is lost because of the careless and uncertain manner in which such a single piston is manipulated. To prevent such action I provide a siphonic member with two pistons or more disposed in proximity to one another so that should one piston fail to make a complete seal the other piston will be brought into action. Then again, a double or multiple piston tends to steady and guide a siphonic member into a bottle and because of the tapering or restricted shape of the bottle neck, one piston may become inactive, but the other piston will immediately assume the duty of the inactive piston and thus maintain the siphonic action. For instance, the first piston to enter the bottle neck will remove the uppermost strata of cream in the narrow portion of the bottle neck. As the piston is forced downwardly and out of engagement with the flaring side wall of the bottle neck, the superposed piston or pistons become active so that there will be a positive seal for establishing a siphonic action for the removal of cream from the bottle neck. So the use of two or more pistons is necessary for a safe, positive and quick extraction of cream from a milk bottle. The advantages gained warrant the use of two or more pistons, which being separately mounted on a siphonic member may be adjusted for a desired action in connection with a milk bottle. Then again, the pistons may be integral and in each and every instance sanitary and easily cleaned material enters into the construction of the device.

My invention will be hereinafter specifically described and then claimed and reference will now be had to the drawing, wherein—

Figure 1 is a vertical sectional view of the cream extracting device in position relative to the milk bottle and preparatory to establishing a siphonic action;

Fig. 2 is a perspective view of the device showing the manner in which the main piston has been brought into action to remove the uppermost strata of cream;

Fig. 3 is a view similar to Fig. 1 showing the siphonic action established and the pistons having accomplished their purpose;

Fig. 4 is a side elevation of the liquid extracting device alone;

Fig. 5 is a similar view showing multiple pistons for the device, and

Fig. 6 is a detail sectional view illustrating a modified form of piston or disk.

As an example of one liquid that may be extracted or removed from another liquid, there is shown a strata of cream 1 on a strata of milk 2 within a milk bottle 3 having a gradually contracted neck 4 terminating at a mouth or opening 5 which is adapted to be closed by a cap, disk or other form of closure (not shown).

For removing the cream 1 from the bottle 2 I employ a gooseneck siphonic member having a short intake arm 6, a return bend 7 and a long discharge arm 8, the space between the arms 6 and 8 being sufficient to permit of the siphonic member being conveniently handled relative to the bottle 3, as clearly shown in Fig. 2. The siphonic member may be made of glass, aluminum or any material that is light in weight and may be maintained in a sanitary condition.

On the short arm 6 of the siphonic member are pistons 9 and 10 placed in spaced or superposed relation. Each piston is made of a flexible or compressible material, as rubber, and each piston may have a relatively thin or rounded peripheral edge 11 and a sleeve or hub portion 12, although in some instances this sleeve or hub portion may be dispensed with, as shown in Fig. 6, and the piston formed with convex faces providing a relatively thick center portion that may be frictionally fitted on the arm 6 or otherwise attached thereto. The long sleeve or hub portions afford sufficient surface for frictional engagement with the arm 6 so that the pistons 9 and 10 may be properly positioned on the arm 6 to fixedly remain in such position during manipulation of the siphonic member.

As shown in Figs. 1 and 2 the diameter of the pistons 9 and 10 slightly exceeds the inner diameter of the bottle neck 4 necessitating flexure or compression of the peripheral edges of the pistons when entering the bottle neck. This is in order that the bottle neck may be sealed and an operative degree of compression produced on the cream. According to Fig. 1 the piston 9 is entering the bottle neck and it will be noted that the peripheral edges of this piston are flexed. With the piston maintained substantially horizontal and transverse of the longitudinal axis of the bottle the piston may be moved downwardly in the bottle neck to force the cream into the open end of the arm 6. Fig. 1 shows a small displacement of cream from a bottle neck and the cream rising in the arm 6. It will be noted that the upper portion of the bottle neck is substantially cylindrical and consequently the piston 9 may be forced downwardly in the bottle neck some distance before said piston becomes inactive. It is during the downward movement of the piston that a sufficient quantity of cream has been displaced and forced upwardly in the arm 6, through the bend 7 to set up a siphonic action, by which cream will continue to flow as shown in Fig. 2.

If only a very small portion of cream is to be removed from the milk bottle, the operator of the siphonic member may cease to force the piston 9 into the bottle and immediately upon the open end of the arm 6 being uncovered, the siphonic action will be broken.

I will assume however, that all of the cream is to be removed and a downward movement of the arm 6 eventually brings the piston 10 into sealed relation with the bottle neck. By this time the piston 9 may have passed out of engagement with the bottle neck, thus leaving the piston 10 as a guide or centering device for the arm 6. The passage of the piston 10 through the bottle neck may be slowly performed or the operator may immediately place the arm 6 in its lowermost position, such as shown in Fig. 3, where the siphonic action continues until the open end of the arm 6 is uncovered. If at any time it is desired to obtain a very small quantity of milk with the cream the bottle can be tilted to place milk in position so that a desired quantity thereof can be removed. This use is unusual, because my device is primarily designed for removing cream only.

In Fig. 5 I show a plurality of pistons 14 somewhat closely assembled and while these pistons may be separate and simply adjoin one another, yet it is possible to make said pistons a unitary structure. The pistons will afford a long bearing when entering a bottle neck and should one or two of the pistons fail to function the other piston is sufficient for the purpose intended. These pistons will maintain the arm 6 in the longitudinal axis of the bottle and prevent tilting of the arm to one side or the other during a pumping action. If the arm is not properly moved into the bottle neck, cream may pass an edge of the lowermost piston, but it will be stopped by the next or following piston, therefore I have positive means for establishing a seal with the bottle neck in order to raise enough cream to start a siphonic action.

The showing in Fig. 4 is suggestive of having the pistons 9 and 10 connected by a long sleeve to afford a unitary structure, but I believe that material may be saved and better results obtained by having the pistons 9 and 10 separated. For instance, there are various sizes and kinds of milk bottles or other receptacles, and when such are encountered the pistons 9 and 10 may be adjusted relative to each other to properly cooperate in the milk bottle.

The use of two or more pistons possess a distinct advantage compared to a single piston, for the reason that many women do not understand the siphonic action which necessitates keeping the lower end of the arm submerged. If the lower piston is not submerged the siphonic action will be stopped, but with the second piston coming into place and sealing the bottle neck air will be excluded from the bottle neck so that when the lower end of the arm is submerged the cream cannot rise outside of the arm, but must rise in the arm and thus set up a siphonic action. Also, any splashing that may be caused by the first or lower disk is intercepted by the upper disk and thus prevented from reaching the exterior of the bottle.

Another feature of the present invention is that the disks are permanently fixed to the tube at the factory or place of assembly and received by the customer in this condition.

This mode of assembly overcomes the possibility of breaking the glass tube and injuring the hands of the user, which frequently occurs when the disk is supplied as a loose element to be fitted on the tube by the user. This particular feature of the invention is valuable even in connection with a single disk device, as will be readily apparent.

It is thought that the operation and utility of the liquid extracting device will be apparent without further description, and while in the drawing there are illustrated the preferred embodiments of my invention, it is to be understood that the structural elements are susceptible to such variations and modifications as fall within the scope of the appended claims.

What I claim is:—

1. A liquid extractor adapted to be placed in a receptacle to remove liquid from the receptacle, said extractor comprising a siphon member, and spaced pistons on said member adapted to be successively brought into engagement with the inner wall of the receptacle.

2. A liquid extractor comprising a tubular return bend siphon member, a piston thereon adapted to be forced into a bottle neck to pass therethrough in engagement with the bottle neck, and expel liquid therefrom, and means on said siphon member engageable with the bottle neck to continue the expelling action after said piston has passed through and out of engagement with said bottle neck.

3. As an article of manufacture, a siphon member having adjustably spaced pistons arranged that one piston maintains an expelling action started by the other piston.

In testimony whereof I affix my signature.

WILLIAM K. ACKERMAN.